US009317397B2

(12) United States Patent
Narutani et al.

(10) Patent No.: US 9,317,397 B2
(45) Date of Patent: Apr. 19, 2016

(54) PROGRAMMABLE LOGIC CONTROLLER (PLC) SIMULATION SYSTEM, PLC SIMULATOR, RECORDING MEDIUM, AND SIMULATION METHOD

(71) Applicant: OMRON Corporation, Kyoto-shi, Kyoto (JP)

(72) Inventors: Fumiaki Narutani, Kusatsu (JP); Taku Oya, Kyoto (JP); Yasunori Sakaguchi, Takatsuki (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 14/383,920

(22) PCT Filed: Feb. 20, 2013

(86) PCT No.: PCT/JP2013/054164
§ 371 (c)(1),
(2) Date: Sep. 9, 2014

(87) PCT Pub. No.: WO2013/136931
PCT Pub. Date: Sep. 19, 2013

(65) Prior Publication Data
US 2015/0058828 A1    Feb. 26, 2015

(30) Foreign Application Priority Data
Mar. 15, 2012    (JP) .................................. 2012-058502

(51) Int. Cl.
*G06F 9/44*    (2006.01)
*G06F 11/36*    (2006.01)
(Continued)

(52) U.S. Cl.
CPC ............ *G06F 11/3664* (2013.01); *G05B 17/02* (2013.01); *G05B 19/056* (2013.01); *G05B 2219/13174* (2013.01); *G05B 2219/13186* (2013.01)

(58) Field of Classification Search
CPC .................................................... G06F 11/3664
USPC ............................................................ 717/135
See application file for complete search history.

(56) References Cited

U.S. PATENT DOCUMENTS

2007/0271450 A1    11/2007    Doshi et al.
2011/0099540 A1*    4/2011    Bae et al. ...................... 717/135

FOREIGN PATENT DOCUMENTS

EP    1857927 A2    11/2007
JP    2001-209408 A    8/2001
(Continued)

OTHER PUBLICATIONS

English Translation of the Written Opinion of the International Searching Authority for PCT/JP2013/054164, dated Mar. 19, 2013, 5pg.*

(Continued)

*Primary Examiner* — Ryan Coyer
(74) *Attorney, Agent, or Firm* — Mots Law, PLLC

(57) ABSTRACT

In a Programmable Logic Controller (PLC) simulation system, at least one of a PLC simulator and an external simulator executes processing while checking the status of program execution in the other. For example, the PLC simulator provides a socket interface, and operates upon receiving various commands from the external simulator. The external simulator checks, using a command, whether processing for a program is being executed or the execution is finished in the PLC simulator. The external simulator checks the status of operation of the program in the PLC simulator, and executes processing accompanying writing to a PLC memory or the like, in a case where contention of access to the PLC memory does not occur.

8 Claims, 7 Drawing Sheets

(51) Int. Cl.
  *G05B 17/02* (2006.01)
  *G05B 19/05* (2006.01)

(56) References Cited

FOREIGN PATENT DOCUMENTS

JP   2001-209412 A   8/2001
JP   2009-223471 A   10/2009

OTHER PUBLICATIONS

ISR issued on Mar. 19, 2013.

Anonymous, "Mutual exclusion, Wikipedia, the free encyclopedia", Mar. 14, 2012, retrieved from the Internet: URL: https://en.wikipedia.org/w/index.php?title=Mutual exclusion&oldid=481837986 (retrieved on Oct. 14, 2014).

* cited by examiner

| Command Name | Content |
|---|---|
| ReadMem | Acquire value stored in designated address |
| WriteMem | Update value stored in designated address |
| GoOneScan | Start execution of one cycle of program |
| CheckPLCState | Acquire status of program execution |
| | |
| | |

PROGRAMMABLE LOGIC CONTROLLER (PLC) SIMULATION SYSTEM, PLC SIMULATOR, RECORDING MEDIUM, AND SIMULATION METHOD

TECHNICAL FIELD

The present invention relates to a programmable logic controller (PLC, hereinafter referred to also as a "PLC"), a PLC simulation system for simulating, using a simulator, devices that communicate with the PLC, and a PLC simulator, and in particular relates to a technique for controlling data access by a PLC and various devices.

RELATED ART

In the development of PLC programs, a PLC simulator is operated on a PC (Personal computer) to debug programs, in order to increase development productivity.

In a PLC, programs and data are stored in a memory. The content of the memory can be rewritten by devices that communicate with the PLC. Such a PLC simulation system is disclosed in Patent Document 1 below, for example.

JP 2009-223471A (Patent Document 1 below) discloses a PLC simulation system provided with a PLC simulator and a PT simulator, in order to simulate an overall PLC system in which a PLC and a programmable terminal (PT), which serves as a display device for the PLC, cooperate with each other, while debugging a program and a display program for the PT.

According to Patent Document 1, the PLC simulator is notified of a user operation performed on the PT simulator. For this reason, the display program for the PT and the program for PLC can be debugged, and for example, the user can execute, on the PC, simulation of an operation to be performed on a touch panel of the PT, or the like.

RELATED ART DOCUMENTS

Patent Documents

Patent Document 1: JP 2009-223471A

SUMMARY OF THE INVENTION

Problem to be Solved by the Invention

As mentioned above, the content of the memory of the PLC is read and written by not only the PLC but also an external device or the like, which communicates with the PLC, accessing the memory content. For this reason, contention of access to the memory of the PLC may occur between the PLC and the external device. Consequently, an unintended operation may be caused.

Accordingly, a technique is necessary for avoiding access contention by controlling access to data in the memory of the PLC in the PLC simulation system, and thereby improving the reliability of the PLC simulation system.

Means for Solving the Problems

A PLC simulation system according to an embodiment is a PLC simulation system including a PLC simulator that cyclically repeats processing based on a first cycle, and an external simulator that cyclically repeats processing based on a second cycle, the PLC simulator including: a storage unit for holding data for executing a program, the storage unit being configured to be accessed by the PLC simulator and the external simulator; and a first execution unit for executing a program accompanying processing for inputting and outputting data to and from the storage unit, the external simulator including: a second execution unit for executing a program accompanying processing for inputting and outputting data to and from the storage unit, wherein at least one of the first execution unit and the second execution unit includes a detection unit for detecting that program execution in the other is complete, and the first execution unit or the second execution unit, after executing the program, suppresses execution of a program accompanying access to the storage unit, until the detection is performed.

Preferably, the PLC simulator may include a socket interface for communicating with the external simulator, and receives a command for causing the PLC simulator to execute predetermined processing, from the external simulator, the first execution unit may execute processing in accordance with the command received using the socket interface, the command may include a notification command for notifying the external simulator of a status of program execution by the first execution unit, and the second execution unit may include the detection unit, and performs the detection using the notification command.

Preferably, the storage unit may include a counter, at least one of the first execution unit and the second execution unit may update a counter value after completing program execution, and the detection unit may perform the detection by detecting updating of the counter value.

Preferably, the storage unit may store a flag, at least one of the first execution unit and the second execution unit may change a value of the flag to a value indicating completion of the execution, after completing program execution, and the detection unit may perform the detection based on the value of the flag.

A PLC simulator according to an embodiment is a PLC simulator that cyclically repeats processing based on a first cycle, including: a storage unit for holding data for executing a program, the storage unit being configured to be accessed by the PLC simulator and an external simulator that cyclically repeats processing based on a second cycle; and an execution unit for executing a program accompanying processing for inputting and outputting data to and from the storage unit, wherein the execution unit includes a detection unit for detecting that program execution in the external simulator is complete, and, after executing the program, suppresses execution of a program accompanying access to the storage unit, until the detection is performed by the detection unit.

A PLC simulator according to an embodiment is a PLC simulator that cyclically repeats processing based on a first cycle, including: an interface for transmitting and receiving information to and from an external simulator that cyclically repeats processing based on a second cycle; a storage unit for holding data for executing a program, the storage unit being configured to be accessed by the PLC simulator and the external simulator; and an execution unit for executing a program accompanying processing for inputting and outputting data to and from the storage unit, wherein the execution unit notifies the external simulator of a status of program execution, using the interface.

According to another embodiment, a computer-readable recording medium is provided. The computer-readable recording medium records a control program for controlling an operation of a PLC simulator. The PLC simulator includes a storage unit configured to be accessed by an external simulator that cyclically repeats processing based on a second cycle, and the PLC simulator cyclically repeats processing based on a first cycle. The control program recorded in this recording medium causes a computer to execute: a step of causing the PLC simulator to execute a user program accompanying processing for inputting and outputting data to and from the storage unit of the PLC simulator; a step of causing the PLC simulator to detect that program execution in the external simulator is complete; and a step of causing, after the user program is executed, the PLC simulator to suppress execution of a user program accompanying access to the storage unit, until the detection is performed.

According to another embodiment, a simulation method for a PLC simulation system is provided. The PLC simulation system includes a PLC simulator that cyclically repeats processing based on a first cycle, and an external simulator that cyclically repeats processing based on a second cycle. The PLC simulator includes a storage unit for holding data for executing a program, the storage unit being configured to be accessed by the PLC simulator and the external simulator. The simulation method includes: a step of the PLC simulator executing a program accompanying processing for inputting and outputting data to and from the storage unit; a step of the external simulator executing a program accompanying processing for inputting and outputting data to and from the storage unit; a step of at least one of the PLC simulator and the external simulator detecting that program execution in the other is complete; and a step of at least one of the PLC simulator and the external simulator suppressing, after executing the program, execution of a program accompanying access to the storage unit, until the detection is performed.

Effects of the Invention

With this configuration, the reliability of a PLC simulation system can be improved.

The above and other objects, features, aspects, and advantages of the invention will be apparent from the following detailed description related to the invention that is to be understood in association with the attached drawings.

EMBODIMENTS OF THE INVENTION

Figure 1:
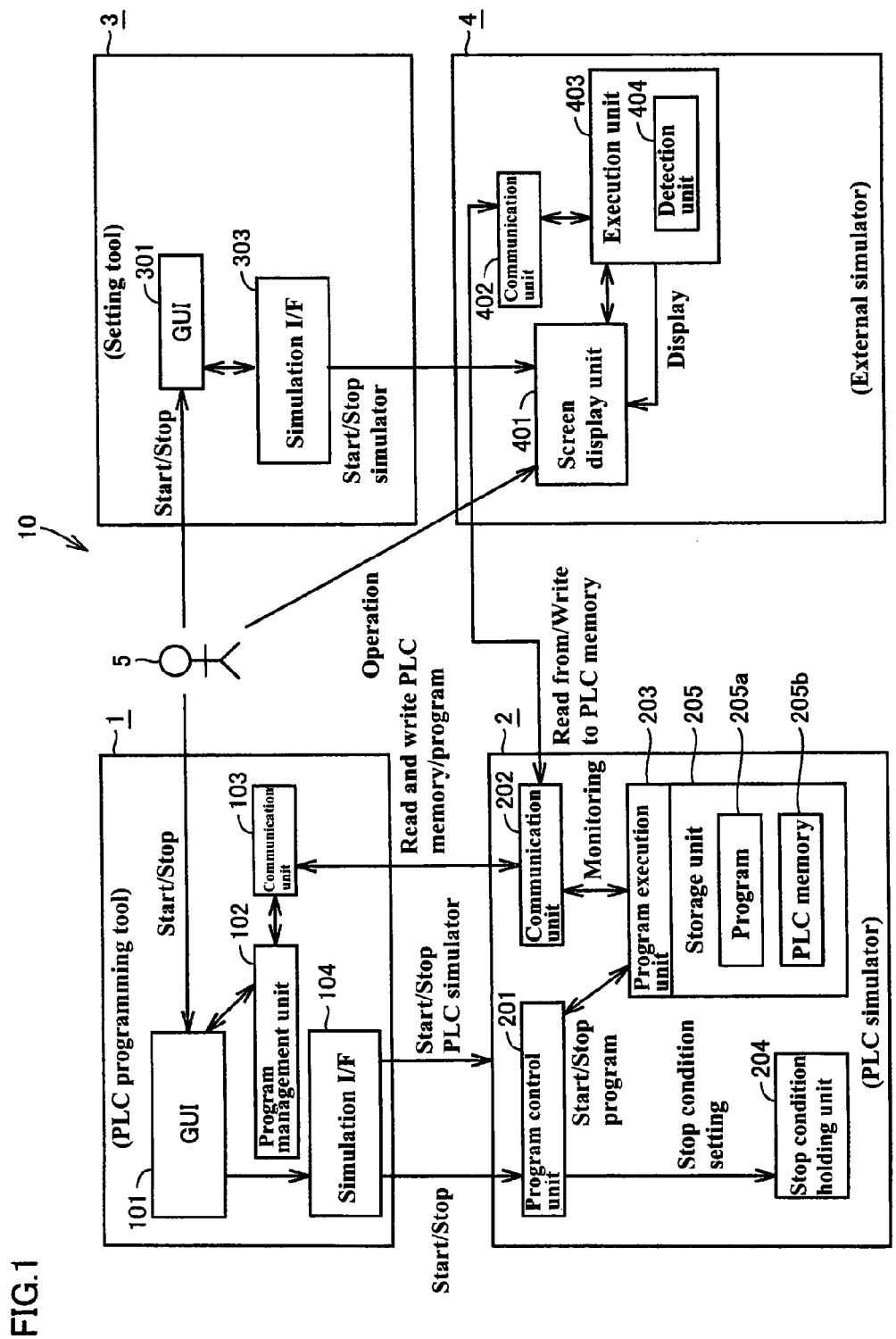
FIG. 1 is a functional block diagram showing a PLC simulation system 10 according to an embodiment of the present invention.

Hereinafter, an embodiment of the present invention will be described with reference to the drawings. In the following description, the same parts are given the same reference numerals. The names and functions thereof are also the same. Accordingly, detail descriptions thereof will not be repeated.

1. Configuration of PLC Simulation System 10

FIG. 1 is a functional block diagram showing a configuration of a PLC simulation system 10 according to the embodiment.

As shown in FIG. 1, this simulation system 10 is configured to include a PLC programming tool 1, a PLC simulator 2, a setting tool 3, and an external simulator 4.

The PLC programming tool 1, the PLC simulator 2, the setting tool 3, and the external simulator 4, which are constituent elements of the simulation system 10, are realized as software by incorporating, into a computer (e.g., a personal computer (PC)), respective dedicated computer programs (PLC programming tool software, PLC simulator software, setting tool software, and external simulator software).

The present embodiment will be described, assuming that the PLC programming tool 1, the PLC simulator 2, the setting tool 3, and the external simulator 4, which are the constituent elements of the simulation system 10, operate on a single PC.

1.1 Configuration of PLC Programming Tool 1

The PLC programming tool 1, which is a tool for debugging the PLC simulator 2, receives an operation of a user 5 and controls execution of the PLC simulator 2.

The PLC programming tool 1 includes a graphical user interface (GUI) 101, a program management unit 102, a communication unit 103 configured as middleware, and a simulation interface (I/F) 104.

The GUI 101 has a function of displaying various kinds of information related to PLC simulation, debugging, and the like (e.g., information related to start and stop of PLC simulation, etc.) to the user 5, and receiving an input operation performed by the user 5.

The program management unit 102 has a function of creating and editing a program. The program management unit 102 performs processing in accordance with an instruction given from the user via the GUI 101. Specifically, the program management unit 102 has a function of reading a program from, or writing a program to, a storage unit 205 via the communication unit 103, and the like.

The communication unit 103 has an interface for communication with a communication unit 202 of the PLC simulator 2.

The simulation interface (I/F) 104 has a function of communicating, to and from the PLC simulator 2, various kinds of information related to PLC simulation, debugging, and the like (e.g., start and stop of the PLC simulator 2, start and stop of a program by a program execution unit 203).

1.2 Configuration of PLC Simulator 2

The PLC simulator 2 has a PLC simulation function, operates based on an operation of the user 5, and outputs a simulation result in cooperation with the external simulator 4.

The PLC simulator 2 provides the external simulator 4 with a socket interface with which the PLC simulator 2 and the external simulator 4 communicate with each other. In a case where the PLC simulator 2 and the external simulator 4 operate on the same PC, the external simulator 4 can operate the PLC simulator 2 by the external simulator 4 giving an instruction to the PLC simulator 2, using the socket interface of the PLC simulator 2. This socket interface will be described later.

The PLC simulator 2 receives instructions to start and stop the PLC simulator from the PLC programming tool 1, and performs starting and stopping operations in accordance with the instructions. The PLC simulator 2 includes a program control unit 201, the communication unit 202, the program execution unit 203, a stop condition holding unit 204, and the storage unit 205.

The storage unit 205 is realized by a RAM (Random Access Memory) or the like, and has a predetermined storage area. The storage unit 205 has a storage area for storing a program 205a that is arbitrarily created by the user, and a PLC memory 205b (input/output memory, data memory, etc.) that is a storage area referenced by the program 205a.

The program execution unit 203 reads out the program 205a from the storage unit 205 and executes the program 205a, in response to a predetermined start instruction and stop instruction being given from the program control unit 201.

The program 205a held in the storage unit 205 and the content of the PLC memory 205b can be monitored from the PLC programming tool 1 via the communication unit 202. Furthermore, the content of the PLC memory 205b can also be read or written from the external simulator 4 via the communication unit 202.

The communication unit 202 has a function of reading and writing data. The communication unit 202 also provides the socket interface to the external simulator 4. The external simulator 4 can operate the PLC simulator 2, using the socket interface.

The program control unit 201 has a function of controlling start and stop of the program 205a by the program execution unit 203, in response to the start instruction and the stop instruction given from the PLC programming tool 1.

The program control unit 201 also has a function of causing, in response to a stop condition setting given from the PLC programming tool 1, the stop condition holding unit 204 to hold a "stop condition" contained in the stop condition setting.

The program control unit 201 has a function of constantly monitoring whether the "stop condition" held in the stop condition holding unit 204 is satisfied, and immediately stopping execution of the program 205a by the program execution unit 203, upon checking that the "stop condition" is satisfied.

Accordingly, for example, the user who performs debugging can stop execution of the program at any timing by causing the stop condition holding unit 204 to set and hold a desired "stop condition". Thus, the user 5 can debug the program, using the PLC programming tool 1 and the PLC simulator 2.

The stop condition holding unit 204 holds a condition under which execution of the program 205a is stopped, as mentioned above.

1.3 Configuration of Setting Tool 3.

The setting tool 3, which is a tool for debugging the external simulator 4, receives an operation of the user 5 and controls start and stop of the external simulator 4.

The setting tool 3 includes a graphical user interface (GUI) 301 and a simulation interface (I/F) 303.

The GUI 301 has a function of displaying various kinds of information related to debugging and the like (e.g., information related to start and stop of simulation of a device communicating with the PLC, etc.) to the user 5, and receiving an input operation performed by the user 5, via a keyboard operation, a mouse operation, or the like.

The simulation interface (I/F) 303 has a function of communicating, to and from the external simulator 4, with various kinds of information related to debugging and the like (e.g., start and stop of the external simulator 4, etc.).

1.4 Configuration of External Simulator 4 The external simulator 4 is a program that exerts a function of simulating a device that operates in cooperation with the PLC simulator 2. In the present embodiment, the external simulator 4 takes the initiative to give a predetermined instruction to the PLC simulator 2 and operate the PLC simulator 2, using the socket interface of the PLC simulator 2.

The external simulator 4 includes a screen display unit 401, a communication unit 402 configured as middleware, and an execution unit 403.

The screen display unit 401 corresponds to an operation screen of an actual device to be a simulation target. The external simulator 4 has a function of receiving, upon an execution operation being started by the execution unit 403, an operation or the like that is virtually performed by the user 5, via a mouse or a keyboard, and delivering the content of this operation to the execution unit 403.

The execution unit 403 operates in accordance with a predetermined program, and performs writing to and reading from a relevant address in the PLC memory 205b of the PLC simulator 2 via the communication unit 402. The execution unit 403 includes a detection unit 404.

The detection unit 404 detects whether or not the program execution unit 203 is executing a predetermined program in the PLC simulator 2. In the present embodiment, the detection unit 404 detects that execution of the predetermined program is complete in the PLC simulator 2, using a later-described socket interface.

1.5 Operation Environment of PLC Simulation System 10

The PLC simulation system 10 having the above-described configuration is realized as software on the PC. Here, a configuration of the PC 11 is shown in FIG. 2.

Figures 2, 3:
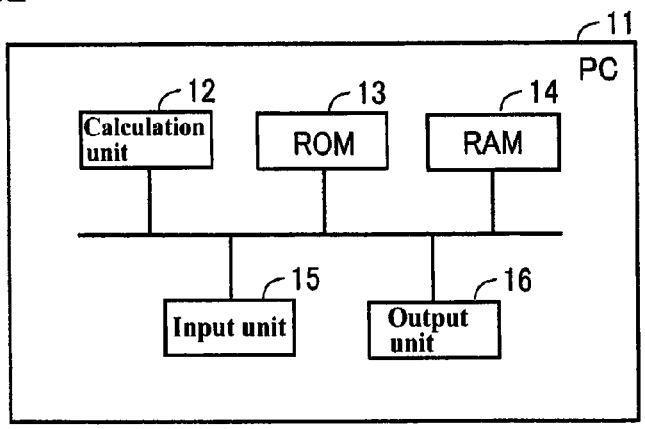
FIG. 2 is a diagram showing a configuration of a PC 11.
FIG. 3 is a diagram showing an example of a command sequence in a socket interface of a PLC simulator 2.

As shown in FIG. 2, the PC 11 includes a calculation unit 12, a ROM (Read Only Memory) 13, a RAM 14, an input unit 15, and an output unit 16.

The calculation unit 12 is provided with a CPU (Central Processing Unit) and controls execution of the programs such as an OS (Operating System), the PLC simulator 2, and the external simulator 4.

The ROM 13 stores various programs.

The RAM 14 is a storage area for executing software, and each program, such as the PLC simulator 2, is operated as a result of the program being loaded into the RAM 14.

The input unit 15 receives an operation performed by the user 5. Specifically, the input unit 15 is constituted by a keyboard, a touch panel, or the like.

The output unit 16 outputs a simulation result and the like. Specifically, it is constituted by a display unit such as a monitor.

2. Socket Interface

Next, the socket interface provided by the PLC simulator 2 will be described.

FIG. 3 is a diagram showing an example of a command sequence in the socket interface of PLC simulator 2.

The external simulator 4 can operate the PLC simulator 2 by means of the socket interface, using commands.

For example, as shown in FIG. 3, a "GoOneScan" command is a command for causing one cycle of a program operated in the PLC simulator 2 to be executed. The external simulator 4 can control whether to cause one cycle of the program operated in the PLC simulator 2 to be executed and then to wait for a predetermined time period, or to cancel the waiting, by designating an argument of the command. Note that the PLC simulator 2 may be configured to start a usual operation of cyclically executing the program, after a lapse of a predetermined time period after the PLC simulator 2 is caused to wait.

For example, a "CheckPLCState" command is a command for acquiring the status of execution the program operated in the PLC simulator 2. With this command, the PLC simulator 2 notifies the external simulator 4 of, as the status of execution of the program operated in the PLC simulator 2, whether the PLC simulator 2 is waiting after finishing execution of the one cycle, or is executing the one cycle.

Accordingly, after giving an instruction to execute the one cycle of the program to the PLC simulator 2 using the "GoOneScan" command, the external simulator 4 acquires the status of program execution in the PLC simulator 2 using the "CheckPLCState" command, and can thereby detect whether or not the PLC simulator 2 has finished processing.

3. Operation

Next, an operation of the PLC simulator 2 and an operation of the external simulator 4 in the PLC simulation system 10 will be described.

In the present embodiment, one of the external simulator 4 and the PLC simulator 2 takes the initiative in control, and the one that takes the initiative gives an instruction to start processing to the other and checks that the processing has been executed.

In the example of this embodiment, the PLC simulator 2 prepares the socket interface. A program operated in the external simulator 4 takes the initiative to operate the PLC simulator 2.

The program operated in the external simulator 4 detects that an operation of the program in the PLC simulator 2 is complete, by executing a predetermined command using the socket interface. After this detection is performed, the program operated in the external simulator 4 performs an operation, such as input/output processing, in accordance with the program.

Thus, the program is executed such that contention of access to the PLC memory 205b is not caused. For this reason, data in the PLC memory 205b can be prevented from being unintentionally altered and causing an unexpected operation.

3.1 Operation in Related Technique

Here, a configuration of a simulation system in which contention of access to a PLC memory may occur will be described for the purpose of comparison with the present invention.

Figure 4:
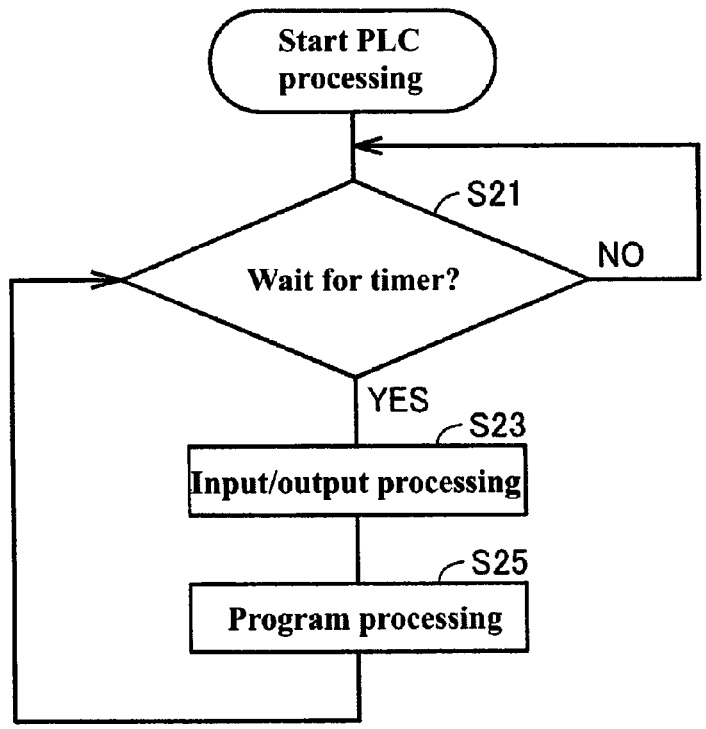
FIG. 4 is a flowchart showing an operation of a PLC simulator in a related technique.

FIG. 4 is a flowchart showing an operation of a PLC simulator in a related technique.

As shown in FIG. 4, the PLC simulator in the related technique cyclically repeats execution of processing. That is to say, every time a predetermined cycle elapses (YES in step S21), the PLC simulator in the related technique performs processing for inputting/outputting data to/from the PLC memory (step S23), and executes a program (step S25).

Figure 5:
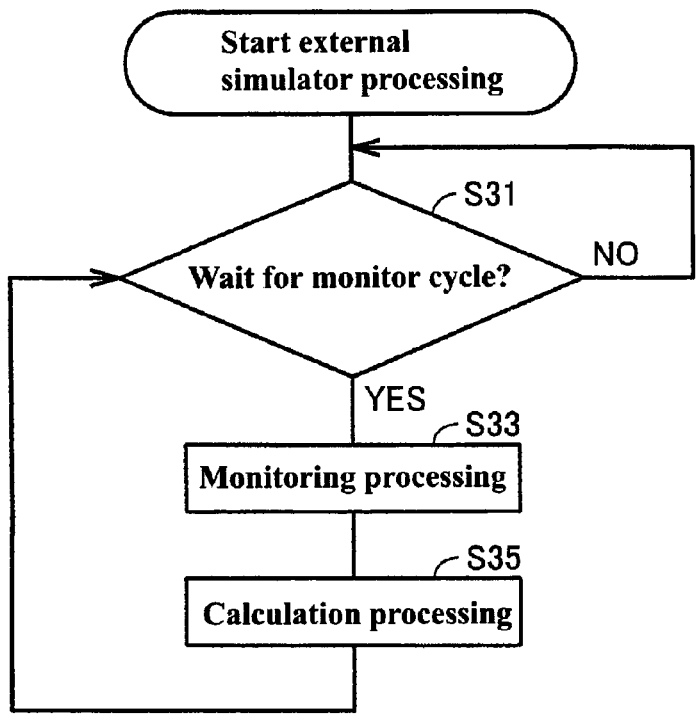
FIG. 5 is a flowchart showing an operation of an external simulator in a related technique.

FIG. 5 is a flowchart showing an operation of an external simulator in the related technique.

As shown in FIG. 5, every time a predetermined monitoring cycle elapses (YES in step S31), the external simulator (e.g., a simulator for an inspection belt conveyer whose operation is controlled by a PLC) in the related technique performs monitoring processing that accompanies access to data in the PLC memory (step S33) and executes predetermined calculation processing (step S35). In this manner, the external simulator cyclically executes a predetermined operation.

Figure 6:
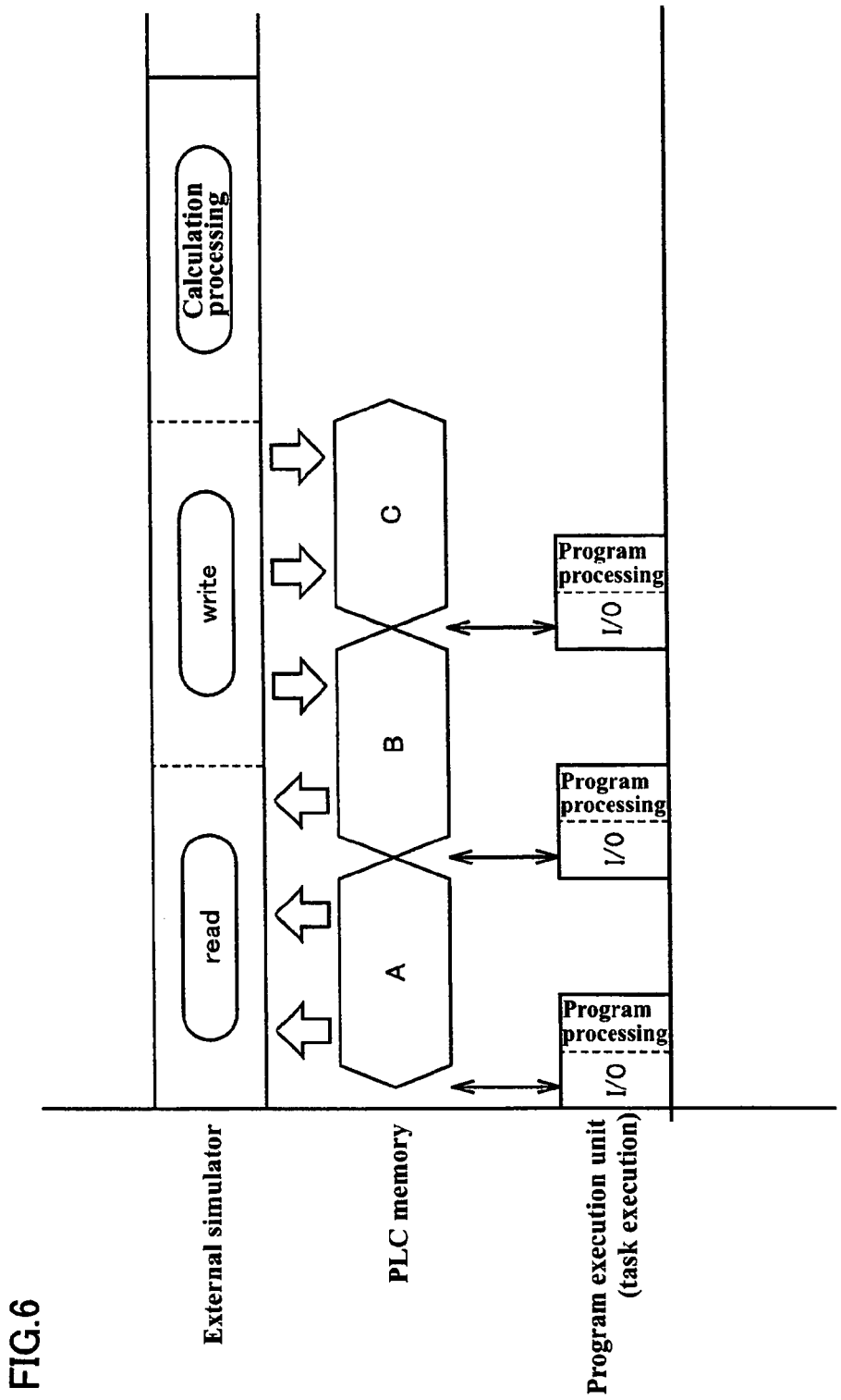
FIG. 6 is a diagram showing an exemplary operation of a simulation system in a related technique.

An exemplary operation of the simulation system in the related technique that operates as described above is shown in FIG. 6. In FIG. 6, it is assumed that the operation cycle of the PLC simulator is shorter than that of the external simulator.

As shown in FIG. 6, in the related technique, since the PLC simulator and the external simulator independently operate, the PLC simulator and the external simulator may access the PLC memory simultaneously. The external simulator accesses the PLC memory and performs the predetermined operation in a predetermined cycle. Data in the PLC memory is rewritten (in FIG. 6, data is rewritten as "A", "B", and then "C") as a result of the PLC simulator, which has a shorter operation cycle than that of the external simulator, executing a task while the external simulator is reading and writing data in the PLC memory.

In the related technique, there is a possibility that the PLC memory is simultaneously accessed by the external simulator and the PLC simulator, and an operation that is not intended by the user may be performed.

3.2 Operations of PLC Simulator 2 and External Simulator 4

Next, operations of the PLC simulator 2 and the external simulator 4 in the present embodiment will be described.

Figure 7:
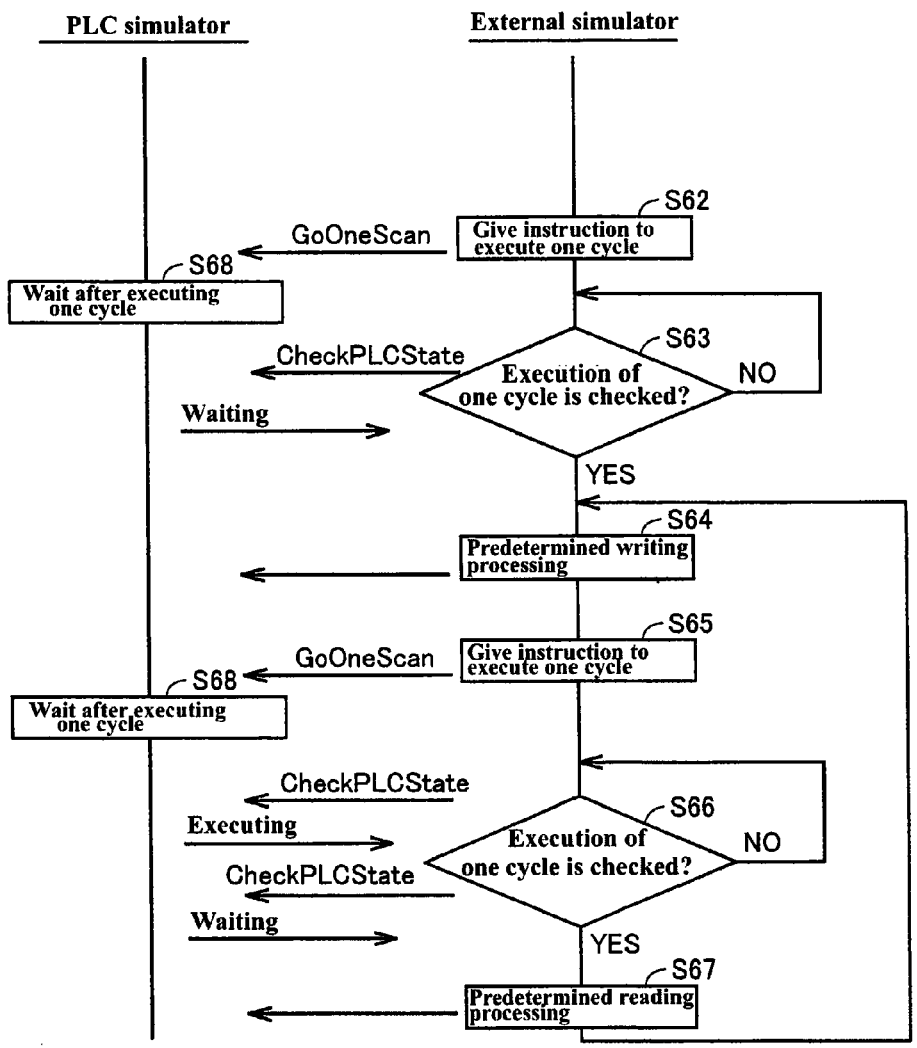
FIG. 7 is a flowchart showing operations of the PLC simulator 2 and an external simulator 4 in the present embodiment.

FIG. 7 is a flowchart showing operations of the PLC simulator 2 and the external simulator 4 in the present embodiment. As shown in FIG. 7, the PLC simulator 2 receives a command from the external simulator 4 using the socket interface, and thereby receives an operation from the external simulator 4. FIG. 7 shows processing in which, after processing such as initialization of the socket, the external simulator 4 starts the operation of the PLC simulator 2 using a command sequence.

The external simulator 4 causes one cycle of the program operated in the PLC simulator 2 to be executed, using the "GoOneScan" command (step S62). The PLC simulator 2, upon receiving the "GoOneScan" command, executes the one cycle of the program, and thereafter waits (step S68).

The external simulator 4 checks, using the "CheckPLCState" command, whether the one cycle has been executed in the PLC simulator 2 (step S63). If the one cycle is being executed in the PLC simulator 2 (NO in step S63), the external simulator 4 uses the "CheckPLCState" command until receiving a response indicating "waiting" from the PLC simulator 2.

If a response indicating "waiting" is received from the PLC simulator 2 after execution of the one cycle is complete (YES in step S63), the external simulator 4 executes predetermined writing processing such as writing to the PLC memory 205b (step S64).

After the writing processing is complete, the external simulator 4 causes the one cycle of the program operated in the PLC simulator 2 to be executed, using the "GoOneScan" command (step S65). The PLC simulator 2, upon receiving the "GoOneScan" command, executes one cycle of the program, and thereafter waits (step S68).

The external simulator 4 checks, using the "CheckPLCState" command, whether the one cycle has been executed in the PLC simulator 2 (step S66).

If a response indicating "waiting" is received from the PLC simulator 2 after execution of the one cycle is complete (YES in step S66), the external simulator 4 executes predetermined reading processing such as reading from the PLC memory 205b (step S67). Thereafter, the external simulator 4 repeats processing in step S64 and subsequent steps.

As described above, the external simulator 4 takes the initiative to execute the program in the PLC simulator 2 through step S65 and the like, and performs processing (step S67 etc.) after checking whether execution in the PLC simulator 2 is complete (whether it is in a BUSY state or an IDLE state) in step S66 and the like.

Figure 8:
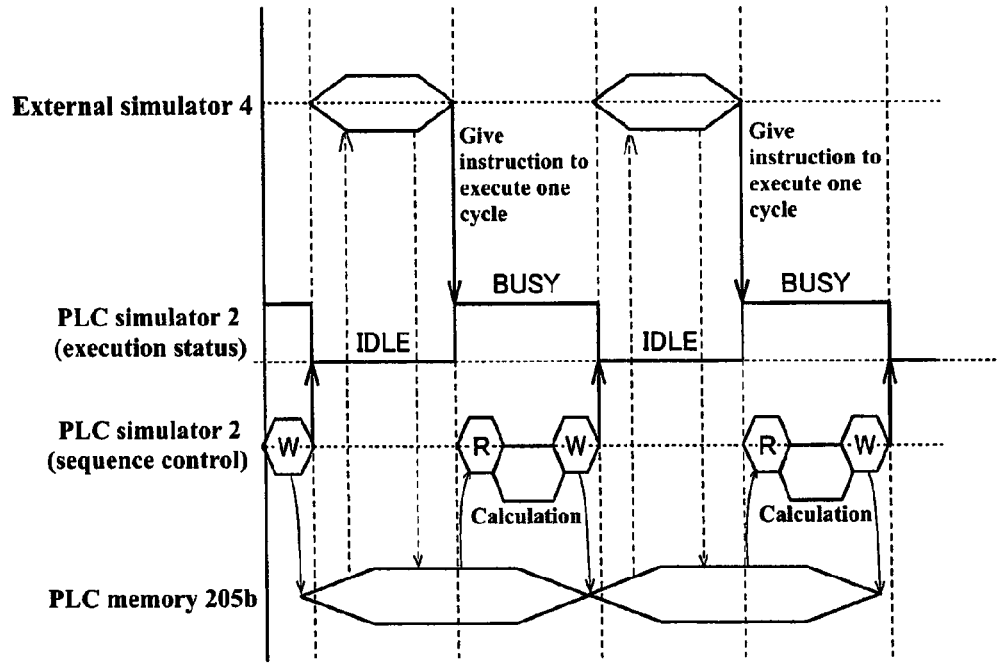
FIG. 8 is a diagram showing a timing chart of the external simulator 4 and the PLC simulator 2.

FIG. 8 shows a timing chart of the external simulator 4 and the PLC simulator 2 that operate as described above.

As shown in FIG. 8, the external simulator 4 and the PLC simulator 2 alternately operate respective programs. Upon the external simulator 4 causing one cycle of the program operated in the PLC simulator 2 to be executed, the PLC simulator 2 performs predetermined calculation, and is in a BUSY state during this calculation.

Note that, in FIG. 8, "W" and "R" indicate writing processing and reading processing, respectively. The external simulator 4 checks the execution status of the PLC simulator 2, using a command that uses the socket interface, and starts processing after the PLC simulator 2 enters a waiting state (IDLE state).

3.3 Modifications

There are also other various methods for detecting that execution of a program in one of the external simulator 4 and the PLC simulator 2 is complete, such that the external simulator 4 and the PLC simulator 2 can alternately operate respective programs. That is to say, the following methods are available as specific methods for exerting the function of the detection unit 404.

Modification 1

Although the external simulator 4 sequentially checks the execution status of the PLC simulator 2 (use of the "Check-PLCState" command) in the above example, alternatively, one of the external simulator 4 and the PLC simulator 2 may notify the other that the execution status is complete, using a predetermined storage area.

Figure 9:
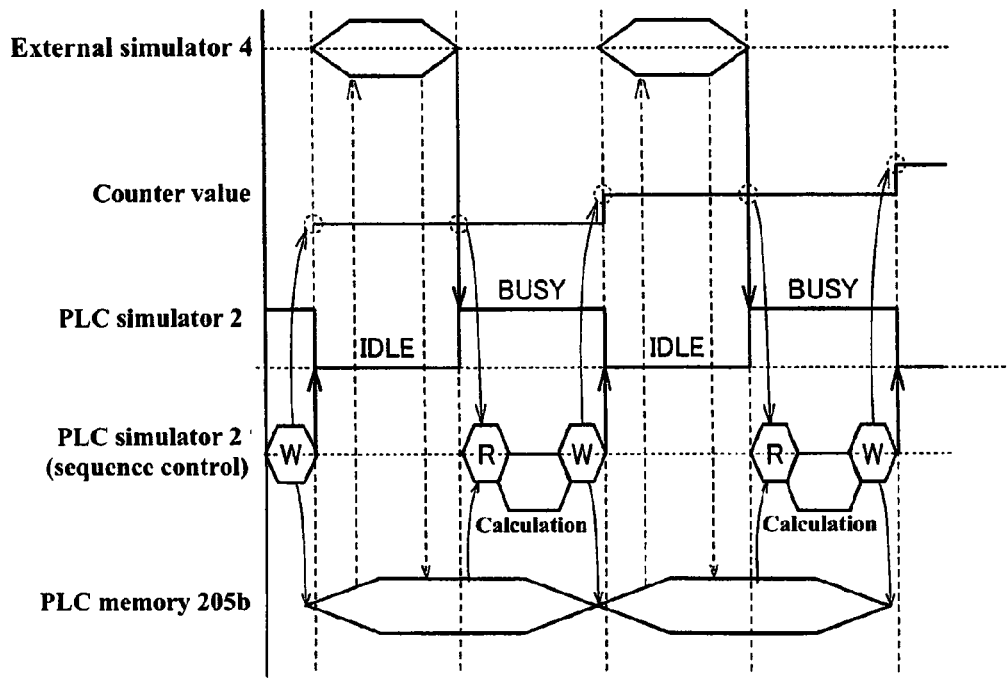
FIG. 9 is a timing chart in a case of giving notification that execution of a program operated in the PLC simulator 2 is complete, using a counter.

FIG. 9 is a timing chart in a case of notifying, using a counter, that execution of the program operated in the PLC simulator 2 is complete.

In the example in FIG. 9, the external simulator 4 takes the initiative to operate the program in the PLC simulator 2. The PLC simulator 2, upon completing the operation, updates a counter value stored in the storage unit 205, for example. The external simulator 4 detects that the operation of the program in the PLC simulator 2 is complete, as a result of the counter value being updated. Note that, in FIG. 9, "W" and "R" indicate writing processing and reading processing, respectively.

As shown in FIG. 9, the PLC simulator 2, upon starting processing, acquires the counter value at the time of predetermined reading processing, executes calculation, and updates the counter value at the time of predetermined writing processing. The external simulator 4 monitors the counter value, and starts processing if the counter value is updated.

Modification 2

One of the external simulator 4 and the PLC simulator 2 may notify the other of the execution status, by storing, in the storage unit 205, for example, a flag indicating completion of the execution by the one of the external simulator 4 and the PLC simulator 2.

For example, it is assumed that the program operated in the PLC simulator 2 operates in a shorter operation cycle than that of the program of the external simulator 4. That is to say, it is assumed that the PLC memory 205b may be accessed by the PLC simulator 2 a plurality of times during the operation of the external simulator 4.

In this case, the external simulator 4, upon completing the operation, turns on the aforementioned flag and thereby notifies the PLC simulator 2 of completion of the operation. If the flag is in an off state when the cycle comes, the PLC simulator 2, whose operation cycle is relatively short, assumes that the operation of the program in the external simulator 4 is not complete, and does not execute processing but waits. If the flag is in an on state, the PLC simulator 2 detects that the operation of the program in the external simulator 4 is complete, and executes processing.

Figure 10:
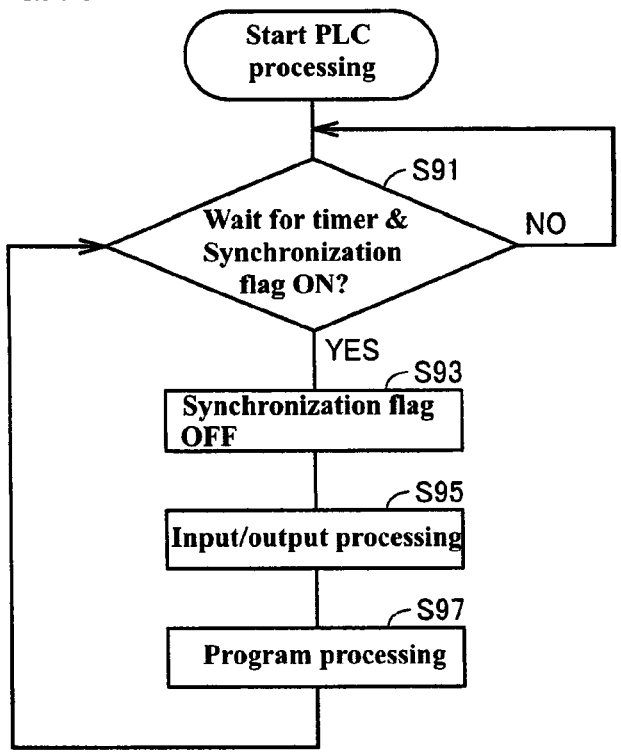
FIG. 10 is a flowchart showing an operation of the PLC simulator 2 in Modification 2.

FIG. 10 is a flowchart showing an operation of the PLC simulator 2 in Modification 2.

If the flag is not in an on state at the time when a predetermined operation cycle comes, the PLC simulator 2 waits and does not execute a program 203a, and thus stops access to the PLC memory 205b (NO in step S91).

If the predetermined operation cycle comes and the flag is in an on state, the PLC simulator 2 turns off the flag by performing processing in step S93.

The PLC simulator 2 accesses the PLC memory 205b and performs predetermine processing, such as processing for inputting/outputting data to/from the PLC memory 205b (step S95), and processing for executing the program 203a using data or the like in the PLC memory 205b (step S97).

Figure 11:
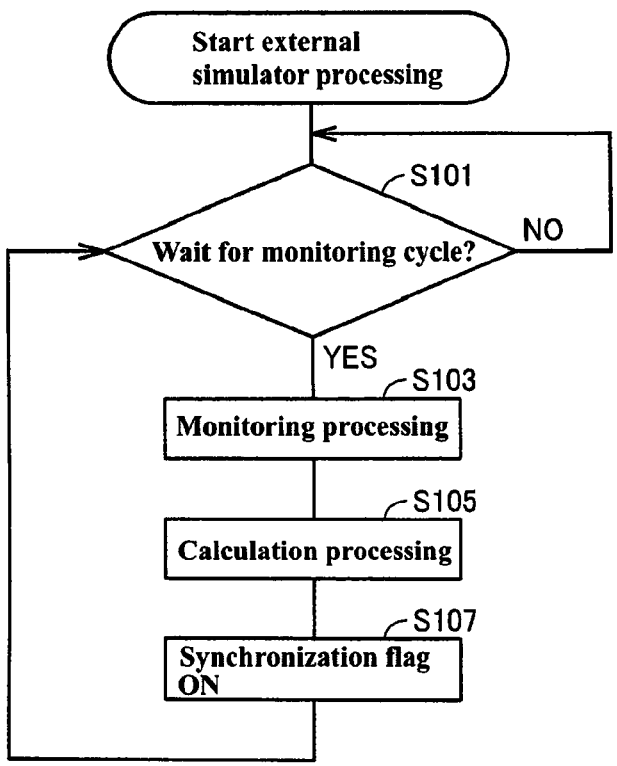
FIG. 11 is a flowchart showing an operation of the external simulator 4 in Modification 2.

FIG. 11 is a flowchart showing an operation of the PLC simulator 4 in Modification 2.

The program operated in the external simulator 4 waits until a predetermined operation cycle (monitoring cycle) comes (NO in step S101). Upon the predetermined cycle coming (YES in step S101), the program operated in the external simulator 4 executes predetermined processing accompanying reading from and writing to the PLC memory 205b, such as monitoring processing (step S103) and calculation processing (step S105). After the processing is complete, the program operated in the external simulator 4 turns on the flag (step S107). By turning on the flag, the external simulator 4 notifies the PLC simulator 2 that processing for the program operated in the external simulator 4 has been executed.

Since the operation cycle of the PLC simulator 2 is shorter than that of the external simulator 4 as mentioned above, the PLC simulator 2 completes access to the PLC memory 205b before the timing of executing cyclic processing of the external simulator 4 comes again. Accordingly, the PLC memory 205b will not be simultaneously accessed by the PLC simulator 2 and the external simulator 4, and a user program can be prevented from operating incorrectly in the external simulator 4, based on unintended data.

The embodiment has been described, assuming that the external simulator 4 detects, using the detection unit 404, that execution of the program in the PLC simulator 2 is complete. As is clear from the description of the above modifications, it is also possible that the PLC simulator 2 detects the execution status of the program in the external simulator 4 and performs control so as to suppress execution of the program in the PLC simulator 2, or the like. That is to say, the function of the detection unit 404 can also be exerted by the PLC simulator 2.

Furthermore, both the external simulator 4 and the PLC simulator 2 may mutually exert the function of the detection unit 404 and detect that execution of the program in the other is complete.

The control program for controlling the operation of the above-described PLC simulator 2 may be distributed by recording this control program in a computer-readable recording medium and distributing the recording medium. The embodiment disclosed at this time is to be considered to be an example in all aspects and not to be restrictive. The scope of this invention is indicated not by the above description but by the claims, and is intended to encompass meaning equivalent to the claims and all modifications within the scope of claims.

The present invention can be used as a PLC simulation system.

INDEX TO THE REFERENCE NUMERALS

1 . . . PLC programming tool, 2 . . . PLC simulator, 3 . . . Setting tool, 4 . . . External simulator, 5 . . . User, 10 . . . PLC simulation system, . . . 11 . . . PC, 12 . . . Calculation unit, 13 ... ROM, 14 ... RAM, 15 ... Input unit, 16 ... Output unit, 101 ... GUI, 102 ... Management unit, 103 ... Communication unit, 104 ... Simulation I/F, 201 ... Control unit, 202 ... Communication unit, 203 ... Program execution unit, 204 ... Stop condition holding unit, 205 ... Storage unit, 205a ... Program, 205b ... PLC memory, 301 ... GUI, 303 ... Simulation I/F, 401 ... Screen display unit, 402 ... Communication unit, 403 ... Execution unit

The invention claimed is:

1. A PLC simulation system including a PLC simulator that cyclically repeats processing based on a first cycle, and an external simulator that cyclically repeats processing based on a second cycle,
the PLC simulator comprising:
a storage unit for holding data for executing a program, the storage unit being configured to be accessed by the PLC simulator and the external simulator; and
a processor communicatively connected to the storage unit, the processor comprising a first execution unit for executing a program accompanying processing for inputting and outputting data to and from the storage unit,
the external simulator comprising:
a second execution unit for executing a program accompanying processing for inputting and outputting data to and from the storage unit,
wherein the second execution unit includes a detection unit for detecting that program execution in the other is complete, and
the first execution unit or the second execution unit, after executing the program, suppresses execution of a program accompanying access to the storage unit, until the detection is performed,
wherein the PLC simulator comprises a socket interface for communicating with the external simulator, and receives a command from the external simulator for causing the PLC simulator to execute predetermined processing,
wherein the first execution unit executes processing in accordance with the command received using the socket interface,
wherein the command includes a notification command for notifying the external simulator of a status of program execution by the first execution unit, and
wherein the detection unit performs the detection using the notification command.

2. The PLC simulation system according to claim 1,
wherein the storage unit includes a counter,
at least one of the first execution unit and the second execution unit updates a counter value after completing program execution, and
the detection unit performs the detection by detecting updating of the counter value.

3. The PLC simulation system according to claim 1,
wherein the storage unit stores a flag,
at least one of the first execution unit and the second execution unit changes a value of the flag to a value indicating completion of the execution, after completing program execution, and
the detection unit performs the detection based on the value of the flag.

4. A PLC simulator that cyclically repeats processing based on a first cycle, comprising:
a storage unit for holding data for executing a program, the storage unit being configured to be accessed by the PLC simulator and an external simulator that cyclically repeats processing based on a second cycle; and
a processor communicatively connected to the storage unit, the processor comprising an execution unit for executing a program accompanying processing for inputting and outputting data to and from the storage unit,
wherein the execution unit includes a detection unit for detecting that program execution in the external simulator is complete, and, after executing the program, suppresses execution of a program accompanying access to the storage unit, until the detection is performed by the detection unit,
wherein the PLC simulator comprises a socket interface for communicating with the external simulator, in which the PLC simulator receives a command from the external simulator for causing the PLC simulator to execute predetermined processing,
wherein the execution unit executes processing in accordance with the command received using the socket interface,
wherein the command includes a notification command for notifying the external simulator of a status of program execution by the execution unit.

5. A PLC simulator that cyclically repeats processing based on a first cycle, comprising:
an interface for transmitting and receiving information to and from an external simulator that cyclically repeats processing based on a second cycle;
a storage unit for holding data for executing a program, the storage unit being configured to be accessed by the PLC simulator and the external simulator; and
a processor communicatively connected to the storage unit, the processor comprising an execution unit for executing a program accompanying processing for inputting and outputting data to and from the storage unit,
wherein the execution unit notifies the external simulator of a status of program execution, using the interface,
wherein the interface comprises a socket interface for communicating with the external simulator, wherein the PLC simulator receives a command from the external simulator for causing the PLC simulator to execute predetermined processing,
wherein the execution unit executes processing in accordance with the command received using the socket interface, and
wherein the command includes a notification command for notifying the external simulator of a status of program execution by the execution unit.

6. A non-transitory computer-readable recording medium that records a control program for controlling an operation of a PLC simulator,
the PLC simulator including a storage unit configured to be accessed by an external simulator that cyclically repeats processing based on a second cycle, and the PLC simulator cyclically repeating processing based on a first cycle,
the control program causing the computer to execute:
a step of causing the PLC simulator to execute a user program accompanying processing for inputting and outputting data to and from the storage unit of the PLC simulator;
a step of causing the PLC simulator to detect that program execution in the external simulator is complete;
a step of causing, after the user program is executed, the PLC simulator to suppress execution of a user program accompanying access to the storage unit, until the detection is performed;
a step of causing the PLC simulator to communicate with the external simulator via a socket interface, in which the PLC similar receives a command from the external simulator for causing the PLC simulator to execute predetermined processing; and a step of causing the PLC simulator to execute processing in accordance with the command received using the socket interface, wherein the command includes a notification command for notifying the external simulator of a status of program execution by the PLC simulator, and wherein the detection is performed by the PLC simulator using the notification command.

7. A simulation method for a PLC simulation system, the PLC simulation system including a PLC simulator that cyclically repeats processing based on a first cycle, and an external simulator that cyclically repeats processing based on a second cycle, the PLC simulator including a storage unit for holding data for executing a program, the storage unit being configured to be accessed by the PLC simulator and the external simulator, the simulation method comprising:

a step of the PLC simulator executing a program accompanying processing for inputting and outputting data to and from the storage unit;

a step of the external simulator executing a program accompanying processing for inputting and outputting data to and from the storage unit;

a step of at least one of the PLC simulator and the external simulator detecting that program execution in the other is complete;

a step of at least one of the PLC simulator and the external simulator suppressing, after executing the program, execution of a program accompanying access to the storage unit, until the detection is performed;

a step of the PLC simulator communicating with the external simulator via a socket interface, in which the PLC similar receives a command from the external simulator for causing the PLC simulator to execute predetermined processing; and a step of the execution unit executing processing in accordance with the command received using the socket interface, wherein the command includes a notification command for notifying the external simulator of a status of program execution by the first execution unit, and wherein the detection is performed by the PLC simulator using the notification command.

8. The PLC simulation system according to claim 1, wherein after the first execution unit finishes executing the program, the PLC simulator goes into an IDLE state.

* * * * *